H. J. DOUGHTY.
FABRIC FOR TIRE CASING.
APPLICATION FILED NOV. 14, 1912.
1,077,125.
Patented Oct. 28, 1913.
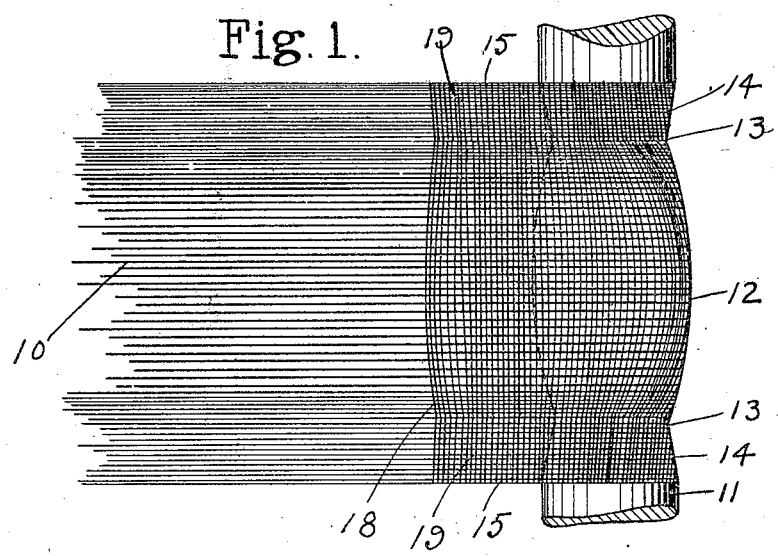
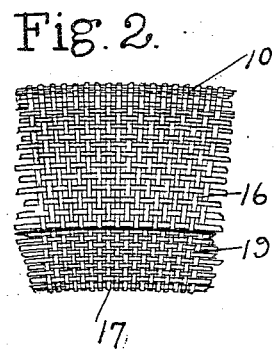
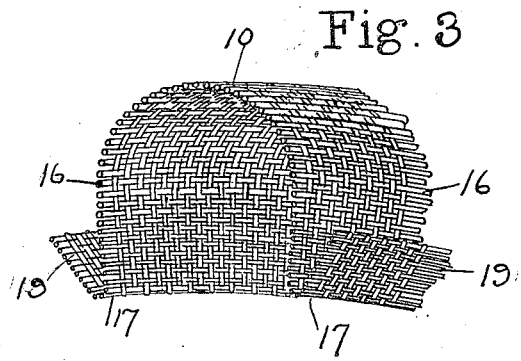
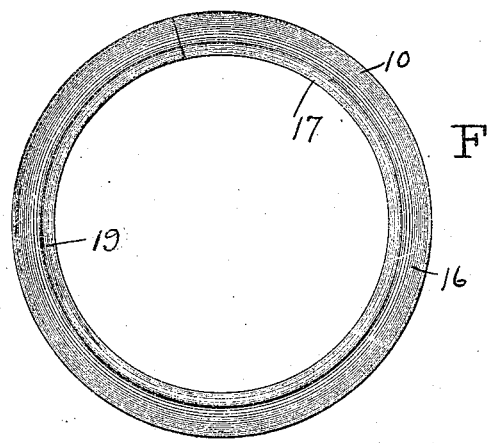
WITNESSES
W. W. Bardsley.
E. I. Ogden.
INVENTOR
Henry J. Doughty.
BY Howard E. Barlow
ATTY.

UNITED STATES PATENT OFFICE.

HENRY J. DOUGHTY, OF EDGEWOOD, RHODE ISLAND.

FABRIC FOR TIRE-CASING.

1,077,125.
Specification of Letters Patent. Patented Oct. 28, 1913.
Application filed November 14, 1912. Serial No. 731,302.

*To all whom it may concern:*

Be it known that I, HENRY J. DOUGHTY, a citizen of the United States, and resident of Edgewood, in the county of Providence and State of Rhode Island, have invented certain new and useful Improvement in Fabric for Tire-Casing, of which the following is a specification.

This invention has for its object to provide a woven fabric more particularly adapted for use in the construction of automobile tire casings whose warp threads run circularly around the tire to pull straight in the direction of the greatest strain, and are longest at the tread and grow gradually shorter on either side to the shortest at the folds of the beads, whereby the fabric when woven naturally takes the contour of the tire casing both circularly and in transverse section. And a further object of the invention is to so weave the fabric that the filling threads while being set at substantially right angles to the warp threads is much more open on the tread portion of the fabric than on the sides.

A further object of the invention is to provide the fabric with larger warp threads on the tread portion of the fabric and less closely laid at said tread portion than on the sides. And a still further object of the invention is the provision of portions of fabric extending laterally from either side of the body portion of the fabric beyond the line of the shortest warp threads, or smallest diameter of the tire, each extension having warp threads increasing in length from the said line of the shortest thread toward its outer edge, said extending portions being for the purpose of coöperating in the construction of the bead or reinforcing the sides of the casing.

With these and other objects in view, the invention consists of certain novel features of construction, as will be more fully described and particularly pointed out in the appended claim.

Of the accompanying drawings: Figure 1— is a plan view illustrating the fabric and the manner of weaving and shaping the same over a forming take-up roll. Fig. 2— is a side elevation of the fabric showing the warp threads as being larger at the tread and gradually growing smaller toward the side or bead portion of the fabric, and also showing the weft threads as radiating, or being much farther apart on the tread than at the sides of the tire. Fig. 3— is a perspective view illustrating the general construction of my improved tire casing fabric showing the warp threads as running circularly around the tire and graduated in size, growing smaller toward the sides, also showing portions of the fabric extending laterally from either side beyond the line of the shortest warp threads for the purpose of coöperating in forming the beads and reinforcing the sides of the casing. Fig. 4— is a side elevation illustrating the fabric as shaped into the form of a tire casing showing the warp threads as running circularly around the casing, the threads at the tread being longer than those at the beads.

My improved fabric is formed primarily to be used in the construction of casings for automobile tires and the like, and its warp threads are arranged to run in a circular direction completely around the tire, thereby pulling straight or in a direct line with the greatest strains, and the length of the warp threads vary so as to naturally take the exact form or contour of the tire, both circularly as measured around the circumference of the tire, and circularly as measured around the tire in transverse section, that is from the reinforcing portion of the bead at the inner edge along the side out to and over the tread and back again to the reinforcing portion of the bead on the opposite side. The threads 10 at the tread are preferably larger than those at the sides 16 and bends 17 as they are called upon to withstand the greatest strain and wear and the weft threads 18 of the fabric are laid straight across in weaving or at substantially a right angle to the warp threads.

I herein employ the term "beads" generically as synonymous with "sides" and as including the portions of the fabric which are positioned at or adjacent the beads of the completed tire.

In order to produce a fabric of my improved construction it is necessary to provide the loom for weaving the same with a take-up roll 11, see Fig. 1, of irregular shape, that is instead of a plain cylinder of uniform diameter as is usually employed in weaving ordinary fabric, I employ one with a larger diameter at its middle portion 12, gradually tapering off on a radius on either side to its two smaller diameters 13—13, then gradually increasing again at the portions 14 to the edges 15 of the fabric whereby side or edge portions 19 are provided with which to form and support the bead portions of the completed tire and reinforce the sides. By this construction it will be seen that the middle or tread portion of the warp threads are the largest and longest and the threads at the bends 17 are the smallest and shortest and the intermediate threads are graduated in length and size between the two points, thereby providing a woven fabric which will naturally take the exact shape of the tire casing in all directions. It will be noted that the warp threads in the sides, and also those in the laterally extending bead portions, are considerably smaller than those in the tread whereby when the bead portions are folded against the sides the thickness of the two plies will approximate that of the tread. In constructing a fabric for this purpose it is found advisable that its center or tread portion should be preferably woven more open than that at the sides or beads, that is there is more space between the warp threads and also more space between the filling threads on the tread than on the sides of the fabric, thereby providing an open weave in both directions on the tread whereby the rubber covering when applied to the fabric under pressure in the construction of the casing, may be forced through the openings between the threads embedding the rubber into the fabric to firmly rivet, bind and secure the tread portion of the rubber to the supporting fabric and render it practically impossible for the rubber to be torn or removed from the tread of the tire, thus producing a tire of great strength and long life, possessing the maximum wearing qualities.

I claim:

A woven tire fabric comprising a central tread portion and bead portions on each side thereof, the warp threads of said bead portions being smaller in diameter than those of the tread portions, and weft threads intersecting the warp threads of both the tread and bead portions, said tread portion presenting a looser weave than said bead portions.

In testimony whereof I affix my signature in presence of two witnesses.

HENRY J. DOUGHTY.

Witnesses:
HOWARD E. BARLOW,
E. I. OGDEN.